United States Patent [19] [11] 4,281,815
O'Connell et al. [45] Aug. 4, 1981

[54] MIRROR MOUNTING BRACKET

[75] Inventors: Lawrence E. O'Connell, Doylestown; Raymond L. Hanisco, Lansdale, both of Pa.

[73] Assignee: Delbar Products, Inc., Perkasie, Pa.

[21] Appl. No.: 122,978

[22] Filed: Feb. 20, 1980

Related U.S. Application Data

[63] Continuation of Ser. No. 963,878, Nov. 27, 1978, abandoned.

[51] Int. Cl.³ .............................................. B65D 63/00
[52] U.S. Cl. .................................................. 248/479
[58] Field of Search ............... 248/479, 484, 485, 486, 248/487

[56] References Cited

U.S. PATENT DOCUMENTS

| | | | |
|---|---|---|---|
| 3,667,718 | 6/1972 | Goslin et al. | 248/487 |
| 3,976,275 | 8/1976 | Clark | 248/487 |
| 3,981,474 | 9/1976 | Szilagyi | 248/487 |
| 4,030,692 | 6/1977 | Szilagyi | 248/487 |
| 4,078,758 | 3/1978 | Mittelhäuser | 248/484 |
| 4,166,651 | 9/1979 | Vandenbrink et al. | 248/487 X |

*Primary Examiner*—William H. Schultz
*Attorney, Agent, or Firm*—Reising, Ethington, Barnard, Perry & Brooks

[57] ABSTRACT

A hollow mirror head assembly including a thin wall mirror supporting shell, an internal bracket member secured between angularly related walls of the mirror head shell to reduce the tendency of said shell to vibrate.

9 Claims, 3 Drawing Figures

MIRROR MOUNTING BRACKET

This is a continuation of application Ser. No. 963,878, filed Nov. 27, 1978, now abandoned.

TECHNICAL FIELD

The subject matter of the present invention relates to a bracket structure for mounting a mirror head to a support arm which is, in turn, adapted to support the mirror head exteriorly of a vehicle body. More specifically, it is the purpose of the present invention to provide a mirror head supporting bracket which rigidifies the mirror head shell to reduce the tendency of the shell to vibrate thereby improving the image reflected by said mirror head.

It is a further object of the invention to secure the bracket structure interiorly of a mirror shell by means which reduce the need to employ externally visible bracket fastening devices such as rivets or friction adjusting screws.

The bracket structure of this invention is also uniquely constructed to allow a predetermined and generally permanent clamping pressure to be set between the bracket and the support arm.

Typically, an outside mounted mirror head comprises a hollow or dish-shaped outer shell having a mirror mounted in the open face thereof and bracket means mounted within the shell to receive one end of a support arm the other end of which is mounted upon the exterior of a vehicle body. In order to reduce the weight and cost of manufacture for such a mirror head, it is desirable to reduce the weight of the various mirror components. In this respect, it is, for example, desirable to utilize a mirror shell formed of a material having a thin cross section. However, as the cross section or gage of the mirror shell is reduced, the rigidity of the shell is also reduced thereby increasing the tendency of the shell to vibrate. Vibration, in turn, is transmitted to the mirror element thereby distorting or reducing the sharpness of the image being viewed through the mirror.

The present invention provides a mirror head mounting bracket structure disposed internally of a thin wall mirror shell and connected to the shell in a way to greatly enhance its rigidity and thereby to reduce the tendency of the shell and mirror to vibrate.

The bracket structure of the invention is also uniquely constructed to enable one end of the mirror head support arm to be permanently clamped within the mirror head in a manner which compensates for manufacturing tolerances as well as for dimensional changes which occur through wear and temperature variations.

BACKGROUND ART

It is common practice to use internally mounted mirror head brackets for adjustably mounting the mirror head upon a body-mounted support arm. Typically, however, such brackets are mounted upon one wall or surface of the mirror shell as is illustrated in U.S. Pat. No. 3,976,275. Vehicle induced vibrations are transmitted through the body-mounted support arm to the bracket and hence to the bracket-supporting surface of the mirror head shell. As noted, as the gage or cross section of the shell is reduced, the vibration is accentuated thereby tending to blur the image being reflected through the mirror element.

It has also been the practice to provide mirror head bracket means wherein the end of the body-mounted support arm disposed within the head is clamped between two coacting members of the bracket means. To compensate for dimensional variations due to manufacture, wear, or temperature, the coacting clamping members commonly have been connected by adjusting screws to permit periodic external adjustment of clamping pressure.

The bracket structure of the present invention reduces mirror head vibration and eliminates the need to periodically adjust the clamping pressure between the mirror head support area and the coacting mirror head bracket means.

DISCLOSURE OF THE INVENTION

For the reasons of cost and overall weight reduction, the outer shell of the mirror head is of a thin wall construction. The shell is of a dish-shaped configuration and includes an open face into which a glass mirror element is adapted to be mounted and retained between an elastomeric seal and a peripheral shell rim. The shell includes a first surface extending generally rearwardly and perpendicular to the open face and a second surface upwardly inclined from the innermost end of the first surface. The second surface comprises most of the area of said shell. An opening is formed centrally in said first surface for receiving one end of a body-mounted support arm. A bracket structure is mounted within the shell and clampingly coacts with the one end of the support arm which projects within the shell for adjustable mounting of the mirror head to the exterior of a vehicle body.

The bracket structure includes a first member having a bifurcated base portion fixed to the first surface of said shell and symmetrically disposed about the support arm opening; and an elongated portion projecting normally to said base portion and spaced from the second shell surface. The elongated portion of said first member terminates in tab or flange portions parallel to and abuttingly connected to said second shell surface. Thus, said first bracket member provides a brace spanning the space between and reinforcing the first and second shell surfaces. In the preferred embodiment of the invention, the tab portions of the first bracket member are adhesively joined to the second shell surface thereby avoiding the need to perforate said surface and eliminating unsightly rivets or other mechanical fastener members.

The elongated portion of said first bracket member includes an offset cylindrical section coaxially disposed to the end of the support arm disposed within said shell.

The bracket structure includes a second member having a pair of planar base sections and an intermediate cylindrical section also coaxially disposed to the end of the support arm disposed within said shell. The planar base portions of the second bracket member are suitably fastened, as by riveting, to the elongated portion of the first bracket member so that cylindrical sections of said members clampingly engage the support arm therebetween. To accurately and permanently control the clamping pressure between the support arm and the bracket members, the second member is formed in such a way that the planar base portions have a predetermined spacing from the coacting elongated portion of the first bracket member prior to riveting the members together. At the same time, that portion of the support arm intermediate the cylindrical portions of said members has a low friction plastic sleeve disposed thereabout. When the bracket members are assembled through riveting, the planar portions of the second member are drawn into abutting relation to the elongated portion of the first member thereby causing the cylindrical sections to exert a controlled clamping pressure against the plastic sleeve covered support arm. In this manner the need for subsequent adjustment of clamping pressure is avoided.

In the foregoing manner the bracket structure reinforces and rigidifies the mirror head shell and adjustably mounts the mirror head upon the support arm in a way that avoids perforations and mechanical fasteners in the largest and most visible area of the mirror head shell.

Reference is now made to the drawings and following description wherein the invention is described in detail.

BEST MODE FOR CARRYING OUT THE INVENTION

Figure 1:
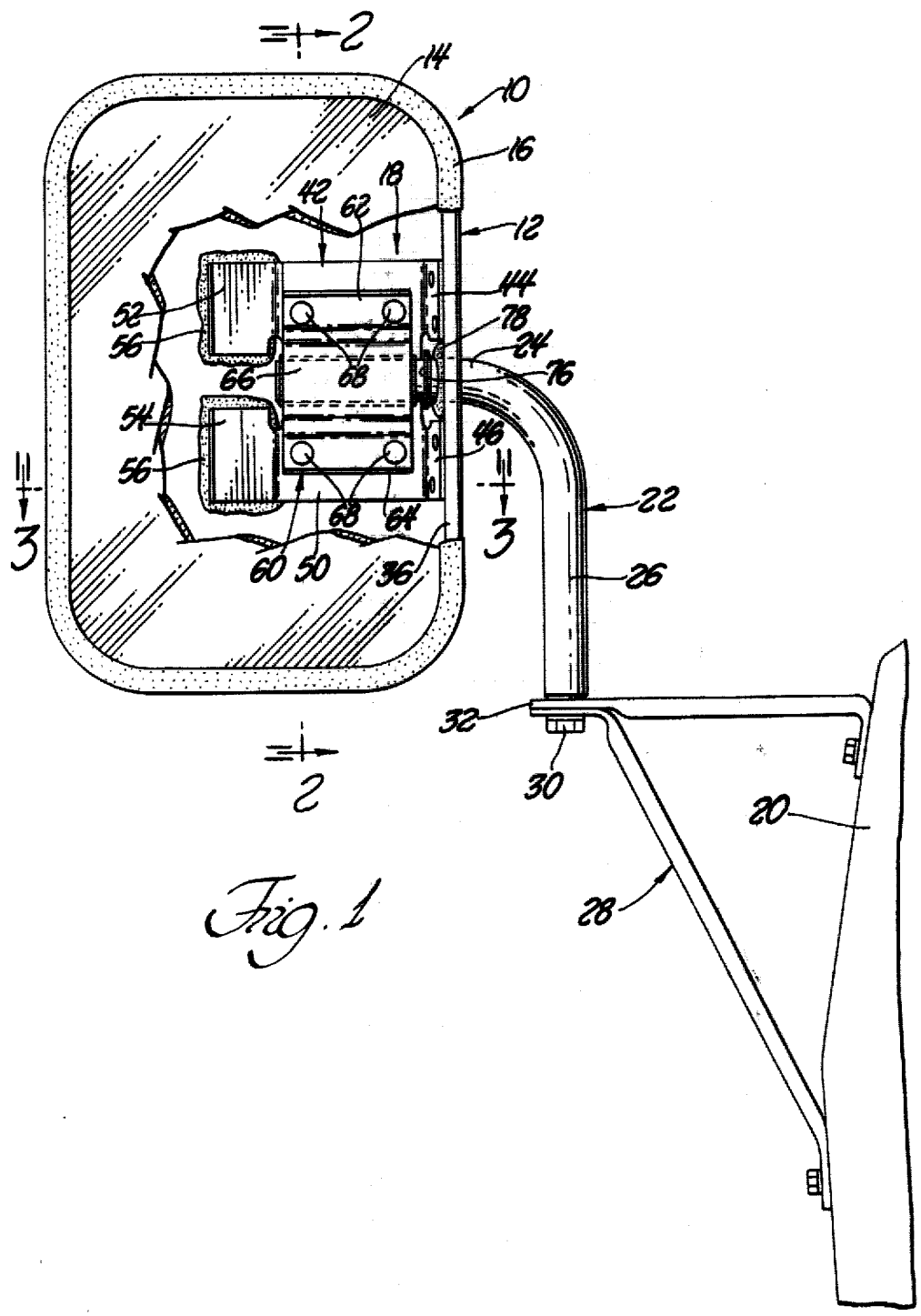
FIG. 1 is an elevational view of the mirror head assembly as mounted on an exterior vehicle wall and with the mirror element partially broken away to show the internally mounted bracket structure.
Figure 2:
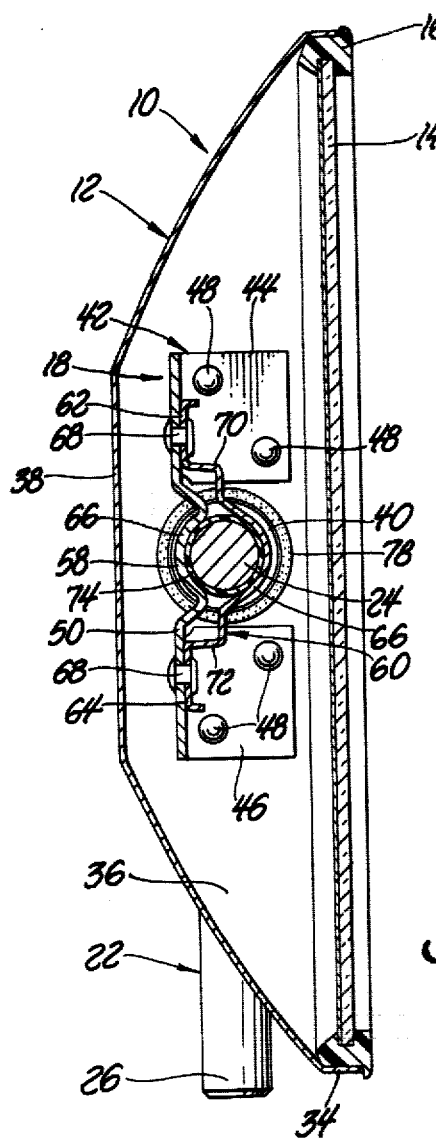
FIG. 2 is a sectional view along line 2—2 of FIG. 1.

Referring to FIGS. 1 and 2, a mirror head assembly is indicated generally at 10 and includes a hollow shell member 12 having an open face within which a glass mirror element 14 is mounted through an elastomeric seal element 16. A bracket structure or subassembly is indicated generally at 18 and is suitably fixed within mirror shell 12. Mirror head 10 is, in turn, supported upon the outer wall 20 of a vehicle body through an L-shaped support arm 22 the horizontal leg 24 of which extends within bracket structure 18 to permit the mirror head to be rotated thereabout. The vertical leg 26 of the support arm is rotatably supported upon a bracket structure 28 fixed to an outer vehicle wall 20. A stud member 30 extends upwardly through a flattened outer portion 32 of bracket 28 and is threaded within the vertical leg 26 of support arm 22 to permit the arm and mirror head 10 to be rotated about a vertical axis and to thereby adjust the inward and outward positioning of the mirror head relative to vehicle wall 20. As noted, mirror head 10 is also adjustable about the horizontal leg portion 24 of arm 22 to vary the up and down inclination of the mirror head. The body mounted bracket 28 may be of any suitable construction such as tubular members having flattened extremities for mounting to the vehicle body and for supporting the mirror head arm 22.

Mirror head shell 12 is an integral member and preferably a metal stamping formed of a thin wall construction. It is to be understood, however, that shell 12 may also be of a molded plastic construction.

Figure 3:
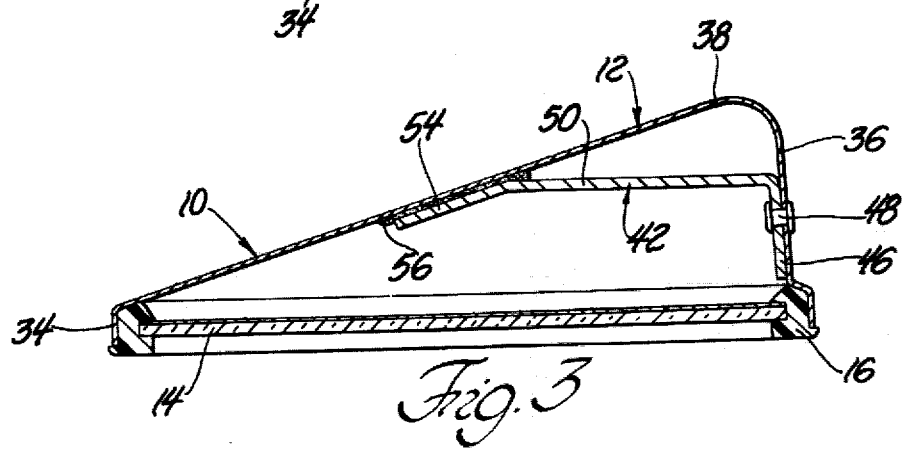
FIG. 3 is a sectional view along line 3—3 of FIG. 1.

As best seen in FIGS. 2 and 3, shell 12 includes a peripheral flange 34 disposed about the open face of the shell. Flange 34 is normally crimped against elastomeric seal element 16 surrounding the outer periphery of mirror element 14 to thereby retain the mirror element within the shell. Shell 12 also includes a first planar surface 36 which extends rearwardly and generally perpendicularly to the glass mirror element 14. The remainder of mirror head shell 12 is primarily comprised of a second surface 38 which extends upwardly and forwardly toward the mirror element from the innermost end of first surface 36. Thus, second surface or wall 38 of the mirror shell comprises the greatest area and the most visible portion of the entire shell surface. For illustrative purposes, mirror element 14 has a thickness of 0.120 inch while the gage or thickness of mirror shell 12 is 0.020 inch.

First surface or wall 36 of the mirror head shell 12 includes an opening 40 through which the horizontal leg portion 24 of support arm 22 is adapted to project for engagement with bracket structure 18.

Bracket structure or subassembly 18 includes a first member 42 having bifurcated base portions 44 and 46 adapted to be fixed to first wall or surface portion 36 through suitable rivet means 48. It is to be noted that base portions 44 and 46 are disposed on laterally opposite sides of opening 40 in the first wall portion 36 of shell 12. The first bracket member 42 also includes an elongated section 50 extending generally perpendicularly to base portions 44 and 46 and, as seen in FIG. 3, in laterally spaced relationship to the second wall or surface 38 of shell 12. The innermost end of elongated portion 50 terminates in a pair of tab portions 52 and 54 formed so as to be disposed parallel to and in abutting relationship with shell wall or surface 38. As best seen in FIG. 3, the combined lengths of elongated portion 50 and tabs 52 and 54 are such that the tabs make contact with shell surface or wall 38 in the area of the lateral midpoint thereof and are suitably fastened or secured thereto.

In the preferred form of the invention, tab portions 52 and 54 of bracket member 42 are fixed or anchored to shell wall portion 38 through a suitable cement or adhesive bond 56. In this manner, it is possible to fix the outermost end portion of bracket member 42 to shell 12 without perforating such shell and connecting the bracket to the shell through the use of rivets or other mechanical fastening devices as has been accomplished in the past. The advantage of this relationship is that such rivets or other mechanical fastening means are eliminated from the outer surface of the mirror head shell and thereby provide a smooth and uninterrupted outer mirror head surface in the most visible area of the mirror head. If there is no objection to the exterior appearance thereof, mirror head shell wall 38 may be perforated to permit suitable rivets or other mechanical fastening means to secure brackets tabs 52 and 54 to wall 38 in lieu of the adhesive bond 56.

As seen in FIG. 3, bracket member 42 thus spans the space between shell walls 36 and 38 and thereby structurally rigidifies the shell reducing the tendency of such thin wall structure to vibrate.

Referring to FIG. 2, elongated portion 50 of bracket member 42 includes an intermediate offset cylindrical section 58 coaxially disposed in relationship to the horizontal leg portion 24 of support arm 22.

Bracket structure 18 includes a second member 60 which includes a pair of transversely spaced base portions 62 and 64 and an intermediate and offset cylindrical section 66 also coaxially disposed in relation to the horizontal leg portion 24 of support arm 22. In its so-called free state, or as unconnected to bracket member 42, base portions 62 and 64 are so formed as to be spaced or have a gap of about 0.030 inch from the elongated portion 50 of bracket member 42. However, when assembled, as shown in the drawings, and attached to the elongated portion 50 of bracket member 42 through suitable rivet members 68, base portions 62 and 64 are drawn into abutting relationship with the elongated portion 50 so that the respective cylindrical sections of members 42 and 60 exert a predetermined clamping pressure on the horizontal leg portion 24 of support arm 22. For example, and as assembled as shown in FIG. 2, cylindrical sections 58 and 66 of the bracket structure exert a fifteen pound clamping pressure against the support arm. By forming bracket member 60 of a spring steel and by incorporating right angular bend portions 70 and 72 between cylindrical section 66 and base portions 62 and 64, the bracket structure will exert a substantially continuous and constant clamping pressure against the support arm and requires no further clamping pressure adjustment after the bracket members 42 and 60 are permanently connected by rivet members 68.

In order to provide for the smooth adjustment of mirror head 10 about support arm 22, a low-friction sleeve, e.g. polyvinyl chloride, 74 is disposed about the horizontal leg portion 24 of the support arm and is therefore disposed between the support arm and the cylindrical portions 58 and 66 of the bracket members 42 and 60.

To prevent mirror head 10 from being removed from support arm 22, a locking washer 76 is mounted about horizontal leg portion 24 and is disposed between the first wall or surface 36 of the shell and the bracket structure 18.

To seal the interior of mirror head 10 from moisture and other deleterious materials, opening 40 in shell 12 is provided with a suitable annular seal 78 which resiliently engages against horizontal leg 24 of support arm 22.

Other modifications of the mirror assembly may be made within the intended scope of the invention as set forth in the hereinafter appended claims.

What is claimed is:

1. A mirror head assembly including a hollow shell having an open face, a peripheral rim formed about the open face of said shell, a mirror element mounted in the open face of said shell and retained therein by said rim, said shell including a first wall extending rearwardly from said rim and being generally perpendicular to said mirror element, said shell including a second wall projecting from the rearmost end of said first wall and terminating at said peripheral rim, an opening formed in said first shell wall, a cylindrical support arm extending through said shell opening, a bracket structure mounted within said shell for adjustably supporting said shell upon said support arm, said bracket structure comprising a first member having a base portion fixed to the first wall of said shell, an elongated planar portion extending normally to said base portion, means bonding the elongated portion of said first member to said second shell wall, the elongated portion of said first bracket member including an offset cylindrical section concentrically disposed to said support arm, said bracket structure including a second member having a pair of transversely spaced planar portions and an intermediate cylindrical section concentrically disposed to said support arm, and means for securing the planar portions of said second member in abutting relationship to the elongated planar portion of said first bracket member to clampingly engage the support arm between the cylindrical sections of said first and second bracket members whereby said shell may be rotatably adjusted about said support arm.

2. A mirror head assembly including a hollow shell having an open face, a peripheral rim formed about the open face of said shell, a mirror element mounted in the open face of said shell and retained therein by said rim, said shell including a first wall extending rearwardly from said rim and being generally perpendicular to said mirror element, said shell including a second wall projecting from the rearmost end of said first wall and terminating at said peripheral rim, an opening formed in said first shell wall, a cylindrical support arm extending through said shell opening, a bracket structure mounted within said shell for adjustably supporting said shell upon said support arm, said bracket structure comprising a first member having a base portion fixed to the first wall of said shell, an elongated planar portion extending normally to said base portion, means bonding the elongated portion of said first member to said second shell wall, the elongated portion of said first bracket member including an offset cylindrical section concentrically disposed to said support arm, said bracket structure including a second member having a pair of transversely spaced planar portions and an intermediate cylindrical section concentrically disposed to said support arm, a low friction plastic sleeve disposed about said support arm intermediate said cylindrical sections, and means for securing the planar portions of said second member in abutting relationship to the elongated planar portion of said first bracket member to clampingly engage the support arm and plastic sleeve between the cylindrical sections of said first and second bracket members whereby said shell may be rotatably adjusted about said support arm.

3. A mirror head assembly including a hollow shell having an open face, a peripheral rim formed about the open face of said shell, a mirror element mounted in the open face of said shell and retained therein by said rim, said shell including a first wall extending rearwardly from said rim and being generally perpendicular to said mirror element, said shell including a second wall projecting from the rearmost end of said first wall and terminating at said peripheral rim, an opening formed in said first shell wall, a cylindrical support arm extending through said shell opening, a bracket structure mounted within said shell for adjustably supporting said shell upon said support arm, said bracket structure comprising a first member having a bifurcated base portion fixed to the first wall of said shell and symmetrically disposed about said wall opening, an elongated planar portion extending normally to said base portion, means bonding the elongated portion of said first member to said second shell wall, the elongated portion of said first bracket member including an offset cylindrical section concentrically disposed to said support arm, said bracket structure including a second member having a pair of transversely spaced planar portions and an intermediate cylindrical section concentrically disposed to said support arm, a low friction plastic sleeve disposed about said support arm intermediate said cylindrical sections, and means for securing the planar portions of said second member in abutting relationship to the elongated planar portion of said first bracket member to clampingly engage the support arm and plastic sleeve between the cylindrical sections of said first and second bracket members whereby said shell may be rotatably adjusted about said support arm.

4. A mirror head assembly including a hollow shell having an open face, a peripheral rim formed about the open face of said shell, a mirror element mounted in the open face of said shell and retained therein by said rim, said shell including a first wall extending rearwardly from said rim and being generally perpendicular to said mirror element, said shell including a second wall projecting from the rearmost end of said first wall and terminating at said peripheral rim, an opening formed in said first shell wall, a cylindrical support arm extending through said shell opening, and the improvement comprising a bracket structure mounted within said shell for adjustably supporting said shell upon said support arm, said bracket structure comprising a first member having a base portion fixed to the first wall of said shell, an elongated planar portion extending normally to said base portion, means bonding the elongated portion of said first member to said second shell wall, the elongated portion of said first bracket member including an offset cylindrical section concentrically disposed to said support arm, said bracket structure including a second member having a pair of transversely spaced planar portions and an intermediate cylindrical section concentrically disposed to said support arm, said second member including first leg portions projecting generally normally from the innermost edges of said spaced planar portions and second leg portions extending generally normally between the upper ends of said first leg portions and the intermediate cylindrical section, and means for securing the planar portions of said second member in abutting relationship to the elongated planar portion of said first bracket member to clampingly engage the support arm between the cylindrical sections of said first and second bracket members whereby said shell may be rotatably adjusted about said support arm.

5. A mirror head assembly including a hollow shell having an open face, a peripheral rim formed about the open face of said shell, a mirror element mounted in the open face of said shell and retained therein by said rim, said shell including a first wall extending rearwardly from said rim and being generally perpendicular to said mirror element, said shell including a second wall projecting from the rearmost end of said first wall and being inclined forwardly toward said mirror element, an opening formed in said first shell wall, a cylindrical support arm extending through said shell opening, a bracket structure mounted within said shell for adjustably supporting said shell upon said support arm, said bracket structure comprising a first member having a base portion fixed to the first wall of said shell, an elongated planar portion extending normally to said base portion and laterally spaced from the second wall of said shell, said elongated portion terminating in a flange portion disposed proximate to the second wall of said shell, means bonding said flange portion to said second shell wall, the elongated portion of said first bracket member including an offset cylindrical section concentrically disposed to said support arm, said bracket structure including a second member having a pair of transversely spaced planar portions and an intermediate cylindrical section concentrically disposed to said support arm, and means for securing the planar portions of said second member in abutting relationship to the elongated planar portion of said first bracket member to clampingly engage the support arm between the cylindrical sections of said first and second bracket members whereby said shell may be rotatably adjusted about said support arm.

6. A mirror head assembly including a hollow shell having an open face, a peripheral rim formed about the open face of said shell, a mirror element mounted in the open face of said shell and retained therein by said rim, said shell including a first wall extending rearwardly from said rim and being generally perpendicular to said mirror element, said shell including a second wall projecting from the rearmost end of said first wall and being inclined forwardly toward said mirror element, an opening formed in said first shell wall, a cylindrical support arm extending through said shell opening, a bracket structure mounted within said shell for adjustably supporting said shell upon said support arm, said bracket structure comprising a first member having a bifurcated base portion fixed to the first wall of said shell and symmetrically disposed about said wall opening, an elongated planar portion extending normally to said base portion and laterally spaced from the second wall of said shell, said elongated portion terminating in bifurcated flange portions disposed proximate to the second wall of said shell, means adhesively bonding said flange portions to said second shell wall, the elongated portion of said first bracket member including an offset cylindrical section concentrically disposed to said support arm, said bracket structure including a second member having a pair of transversely spaced planar portions and an intermediate cylindrical section concentrically disposed to said support arm, a low friction plastic sleeve disposed about said support arm intermediate said cylindrical sections, and means for securing the planar portions of said second member in abutting relationship to the elongated planar portion of said first bracket member to clampingly engage the support arm and plastic sleeve between the cylindrical sections of said first and second bracket members whereby said shell may be rotatably adjusted about said support arm.

7. A mirror head assembly including a hollow shell having an open face, a peripheral rim formed about the open face of said shell, a mirror element mounted in the open face of said shell and retained therein by said rim, said shell including a first wall extending rearwardly from said rim and being generally perpendicular to said mirror element, said shell including a second wall projecting from the rearmost end of said first wall and being inclined forwardly toward said mirror element, an opening formed in said first shell wall, a cylindrical support arm extending through said shell opening, a bracket structure mounted within said shell for adjustably supporting said shell upon said support arm, said bracket structure comprising a first member having a base portion fixed to the first wall of said shell, an elongated planar portion extending normally to said base portion and laterally spaced from the second wall of said shell, said elongated portion terminating in a flange portion disposed proximate to the second wall of said shell, means adhesively bonding said flange portion to said second shell wall, the elongated portion of said first bracket member including an offset cylindrical section concentrically disposed to said support arm, said bracket structure including a second member having a pair of transversely spaced planar portions and an intermediate cylindrical section concentrically disposed to said support arm, said second member including first leg portions projecting generally normally from the innermost edges of said spaced planar portions and second leg portions extending generally normally between the upper ends of said first leg portions and the intermediate cylindrical section, and means for securing the planar portions of said second member in abutting relationship to the elongated planar portion of said first bracket member to clampingly engage the support arm between the cylindrical sections of said first and second bracket members whereby said shell may be rotatably adjusted about said support arm.

8. A mirror head assembly including a hollow shell having an open face, a peripheral rim formed about the open face of said shell, a mirror element mounted in the open face of said shell and retained therein by said rim, said shell including a first wall extending rearwardly from said rim and being generally perpendicular to said mirror element, said shell including a second wall projecting from the rearmost end of said first wall and terminating at said peripheral rim, an opening formed in said first shell wall, a cylindrical support arm extending through said shell opening, a bracket structure mounted within said shell for adjustably supporting said shell upon said support arm, said bracket structure comprising a first member having a base portion fixed to the first wall of said shell, an elongated planar portion extending normally to said base portion, means securing the elongated portion of said first member to said second shell wall, the elongated portion of said first bracket member including an offset cylindrical section concentrically disposed to said support arm, said bracket structure including a second member having a pair of transversely spaced planar portions and an intermediate cylindrical section concentrically disposed to said support arm, and means for securing the planar portions of said second member in abutting relationship to the elongated planar portion of said first bracket member to clampingly engage the support arm between the cylindrical sections of said first and second bracket members whereby said shell may be rotatably adjusted about said support arm.

9. A mirror head assembly including a hollow shell having an open face, a peripheral rim formed about the open face of said shell, a mirror element mounted in the open face of said shell and retained therein by said rim, said shell including a first wall extending rearwardly from said rim and being generally perpendicular to said mirror element, said shell including a second wall projecting from the rearmost end of said first wall and being inclined forwardly toward said mirror element, an opening formed in said first shell wall, a cylindrical support arm extending through said shell opening, a bracket structure mounted within said shell for adjustably supporting said shell upon said support arm, said bracket structure comprising a first member having a base portion fixed to the first wall of said shell, an elongated planar portion extending normally to said base portion and laterally spaced from the second wall of said shell, said elongated portion terminating in a flange portion disposed proximate to the second wall of said shell, means securing said flange portion to said second shell wall, the elongated portion of said first bracket member including an offset cylindrical section concentrically disposed to said support arm, said bracket structure including a second member having a pair of transversely spaced planar portions and an intermediate cylindrical section concentrically disposed to said support arm, said second member including first leg portions projecting generally normally from the innermost edges of said spaced planar portions and second leg portions extending generally normally between the upper ends of said first leg portions and the intermediate cylindrical section, and means for securing the planar portions of said second member in abutting relationship to the elongated planar portion of said first bracket member to clampingly engage the support arm between the cylindrical sections of said first and second bracket members whereby said shell may be rotatably adjusted about said support arm.

* * * * *